US010259371B1

(12) United States Patent
Behr

(10) Patent No.: US 10,259,371 B1
(45) Date of Patent: Apr. 16, 2019

(54) RETRACTABLE POLE WITH CURVED MAGNETIC GRIP FOR BOAT TRAILER HOOK TO ATTACH TO BOAT U-BOLT

(71) Applicant: Lee Ronald Behr, Bel Air, MD (US)

(72) Inventor: Lee Ronald Behr, Bel Air, MD (US)

( * ) Notice: Subject to any disclaimer, the term of this patent is extended or adjusted under 35 U.S.C. 154(b) by 0 days.

(21) Appl. No.: 15/843,604

(22) Filed: Dec. 15, 2017

(51) Int. Cl.
*B63B 21/54* (2006.01)
*B60P 3/10* (2006.01)
*B25J 1/04* (2006.01)

(52) U.S. Cl.
CPC .............. *B60P 3/1075* (2013.01); *B25J 1/04* (2013.01); *B63B 21/54* (2013.01)

(58) Field of Classification Search
CPC .. B63B 21/02; B63B 21/54; B25J 1/04; B25J 15/0608; A47F 13/06; B60P 3/1075
USPC .................. 294/190, 191, 209–211
See application file for complete search history.

(56) References Cited

U.S. PATENT DOCUMENTS

| | | | | |
|---|---|---|---|---|
| 2,166,024 A * | 7/1939 | Schmidt | ................. | B25G 3/36 294/65.5 |
| 2,660,468 A * | 11/1953 | Cook | ................. | E21B 31/06 294/65.5 |
| 2,709,002 A * | 5/1955 | Hoff | ................. | A47L 13/41 209/215 |
| 2,760,809 A * | 8/1956 | Mallin | ................. | H01F 7/0257 294/65.5 |
| 3,273,928 A * | 9/1966 | Wisniewski | ........ | B63L 321/54 114/221 R |
| 3,905,631 A * | 9/1975 | Ricks | ................. | E21B 31/06 294/65.5 |
| 3,913,515 A * | 10/1975 | Hernsjo | ................. | B63L 321/54 114/221 R |
| 4,793,646 A * | 12/1988 | Michaud, Jr. | ........ | B63L 321/54 114/221 R |
| 4,986,207 A * | 1/1991 | Reed | ................. | B63L 321/54 114/221 R |
| 5,190,330 A | 3/1993 | Dunham | | |
| 5,215,344 A * | 6/1993 | Augustyniak | ........ | B60P 3/1066 114/221 R |
| 5,487,576 A * | 1/1996 | DuVivier | ................. | B25B 9/00 294/210 |
| 5,979,957 A * | 11/1999 | Conrad | ................. | A47L 13/40 209/215 |
| 6,065,787 A * | 5/2000 | Jarosch | ................. | B25B 9/00 294/210 |
| 6,273,017 B1 * | 8/2001 | Griffin | ................. | B63L 321/54 114/221 R |
| 6,409,240 B1 * | 6/2002 | Ferguson | ................. | B63B 21/54 114/221 R |
| 6,412,432 B1 * | 7/2002 | White | ................. | B63L 321/04 114/221 R |

(Continued)

FOREIGN PATENT DOCUMENTS

WO WO-2008006159 A1 * 1/2008 ............. B63B 21/54

*Primary Examiner* — Dean J Kramer
(74) *Attorney, Agent, or Firm* — Dunlap Bennett & Ludwig PLLC

(57) ABSTRACT

A device for pulling a boat onto a trailer from the water includes a curved magnet with rubber side grips attached to a proximal end of an elongated, retractable, rigid pole. The magnet grabs a metal hook on the end of a boat trailer. The pole allows attachment of the trailer hook to the boat U-bolt without the need for an individual to get into the water to attach the boat. The pole can be stored when not in use, using straps.

9 Claims, 3 Drawing Sheets

(56) References Cited

U.S. PATENT DOCUMENTS

| | | |
|---|---|---|
| 6,978,730 B1 | 12/2005 | McCarthy |
| 8,267,030 B1 | 9/2012 | McHugh et al. |
| 8,752,877 B2 * | 6/2014 | Spindler .................. F21S 4/10 |
| | | 294/209 |
| 2003/0047953 A1 * | 3/2003 | Hechimovich ......... F16G 17/00 |
| | | 294/211 |
| 2010/0320783 A1 * | 12/2010 | Chepurny ............... F16B 45/02 |
| | | 294/210 |

* cited by examiner

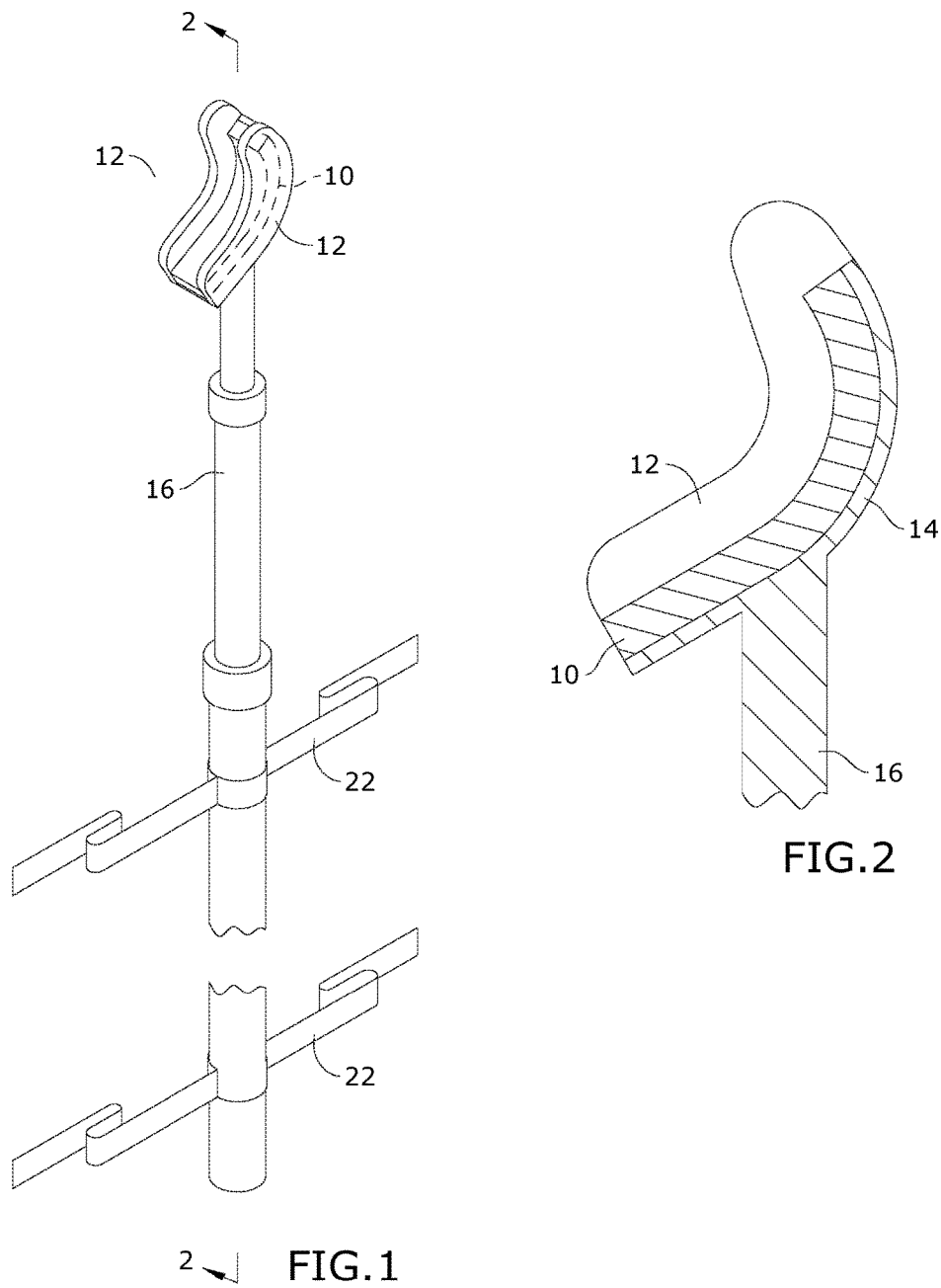

RETRACTABLE POLE WITH CURVED MAGNETIC GRIP FOR BOAT TRAILER HOOK TO ATTACH TO BOAT U-BOLT

BACKGROUND OF THE INVENTION

The current invention relates to tools for bringing a boat out of the water, or more particularly, to a retractable pole with a curved magnet grip for a boat trailer hook to attach to a boat U-bolt.

When a boat user is bringing a boat out of the water and onto a trailer, there is a process of hooking it to the trailer. Once the trailer is backed up into the water, the individual must get into the water to hook the boat. This is time consuming and inconvenient. Further, more than one person is often needed to accomplish this task.

There exists a need for a device that allows the attachment of a trailer hook to a boat U-bolt without the need for individual to get into the water.

SUMMARY OF THE INVENTION

The present invention relates to a method of attaching a boat to a trailer by providing a boat attachment device. The boat attachment device includes an elongated rigid pole, the pole being extendable and retractable, and a curved magnet at a proximal end of the elongated rigid pole, the curved magnet attracted to and fitting over a metal hook of a trailer. The method further comprises winding a crank on the trailer to extend the metal hook attached to the curved magnet towards the boat, the metal hook attached to a proximal end of an extendable and retractable wire attached to the crank, and the elongated rigid pole extending with the moving metal hook. Next, the method includes maneuvering the metal hook to hook on a U-bolt on the boat. The elongated rigid pole is then pulled back by a user to release the curved magnet from the metal hook. The crank is then winded back to retract the metal hook with the attached boat towards the trailer.

In one embodiment, the elongated pole extends up to 12 feet. In one embodiment, the curved magnet includes a rubber side grip on each side of the curved magnet.

In one aspect, the metal hook and the curved magnet are substantially the same curved shape. In one embodiment, the boat is retracted by an individual near the trailer, the individual not getting in the water to retract the boat towards the trailer.

In one embodiment, the elongated pole includes straps to secure around the extended pole when retracted. In one embodiment, the metal hook is maneuvered onto the boat U-bolt by manually maneuvering the elongated pole.

BRIEF DESCRIPTION OF THE DRAWINGS

FIG. 1 is a perspective view of one embodiment of the invention;

FIG. 2 is a section view of the invention, taken along section 2-2 of FIG. 1;

DETAILED DESCRIPTION OF THE INVENTION

Figure 3:
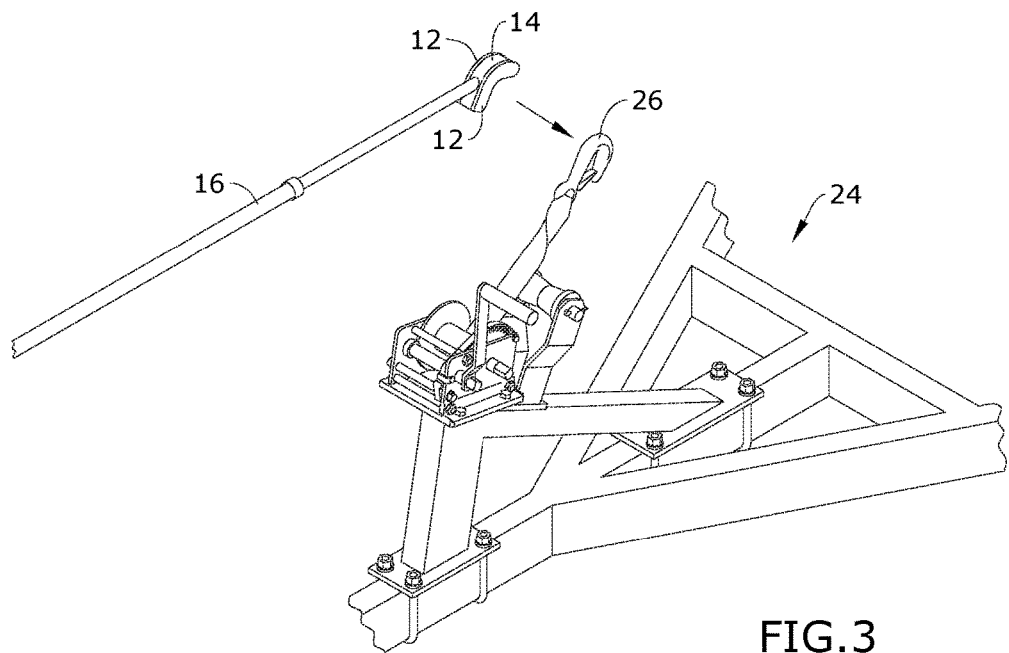
FIG. 3 is a perspective view of one embodiment of the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As previously stated, boaters must get into the water to hook their boat onto a trailer. The invention claimed here solves this problem.

Broadly, one embodiment of the present invention is a retractable pole with a curved magnet that allows the boat to be hooked to the trailer from land. The trailer is then cranked to pull the boat onto the trailer without the need for a boater to get into the water.

As shown in the embodiment of FIG. 1, a retractable or telescoping pole 16 includes a curved magnet 10 at a proximal end of the telescoping pole 16. The curved magnet 10 includes two rubber side grips 12. Also attached to the telescoping pole 16 are storage straps 22. The retractable pole extends to about 12 feet or longer. In one embodiment, the pole is made of aluminum or a galvanized material. It is to be understood that the materials of the pole 16 and the side grips 12, however, can be any suitable material.

As shown in FIG. 2 (a sectioning view along section 2-2 of FIG. 1), the curved magnet 10 is attached to and fits with a curved pole head 14 of the telescoping pole 16. The curved magnet 10 includes a front surface, a rear surface opposite the front surface, a first side edge, a second side edge opposite the first side edge, a top end, and a bottom end opposite the top end. The rear surface is coupled to the pole 16 and the front surface includes a bend less than 180 degrees that defines a concave shape curving from the top end to the bottom end. The concave shape is facing away from the pole 16. As illustrated in FIGS. 1 and 2, the first side grip 12 is disposed along the first side edge and protruding away from the pole 16 and a second side grip 12 is disposed along the second side edge and protruding away from the pole 16. A channel is defined by the first side grip 12, the second side grip 12, and the front surface of the curved magnet 10. The channel is configured to receiver a hook 26 therein.

Figure 4:
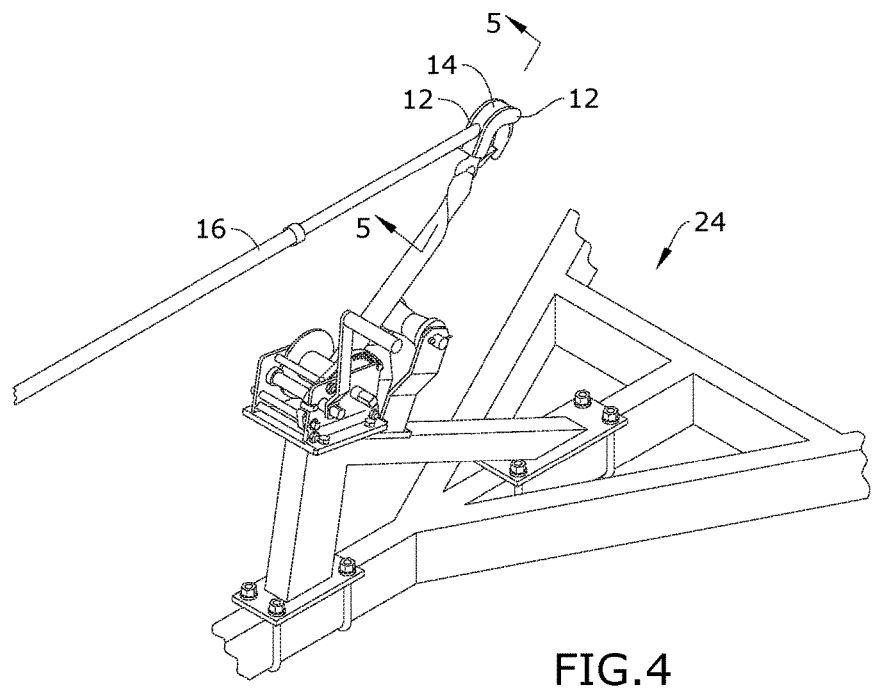
FIG. 4 is a perspective view of one embodiment of the invention.
Figure 5:
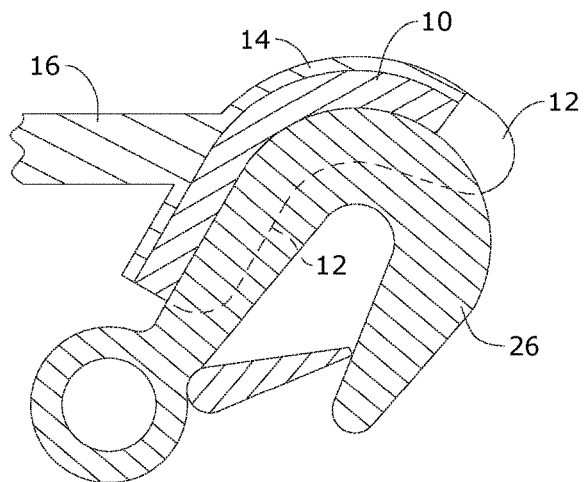
FIG. 5 is a section view of one embodiment of the invention, taken along section 5-5 of FIG. 4.

FIGS. 3 and 4 show one embodiment of the invention in use. The curved magnet 10 is shaped to magnetically attach and fit directly onto a similarly shaped, winched metal hook 26 of a boat trailer 24. FIG. 5 shows a sectional view taken along 5-5 of 15 FIG. 4. The curved magnet 10 is shown fitting around the winched hook 26 with the sidegrip 12 laterally surrounding the hook 26.

Figure 6:
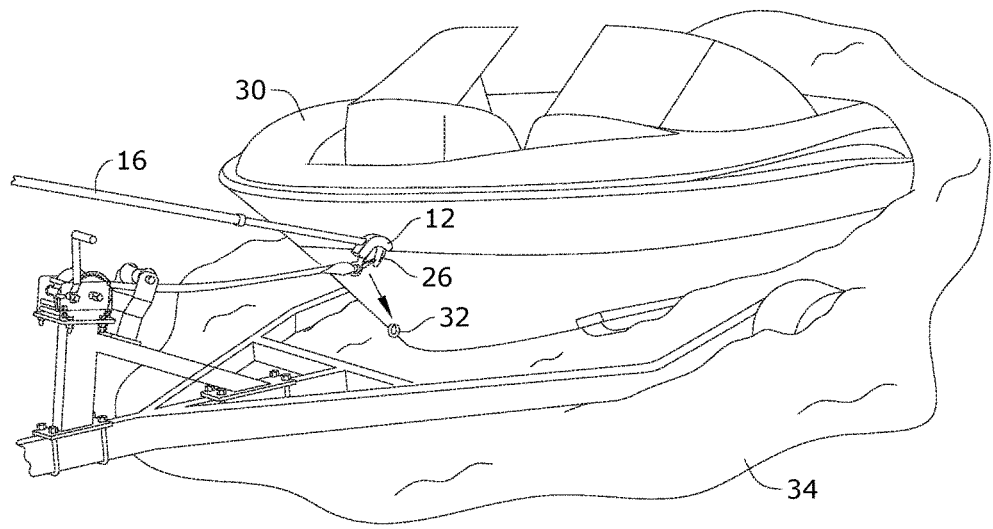
FIG. 6 is a perspective view of one embodiment of the invention.

The embodiment of FIG. 6 shows the device latching onto a boat. In operation, an individual stands near a distal end of the trailer and extends a crank rope or wire attached to the hook 26. The hook 26, attached magnet 10, and extendable pole 16 are all extended to a U-bolt 32 on the boat 30 in the water 34. The hook 26 is manually maneuvered to hook onto the U-bolt 32 by maneuvering the elongated pole 16. Once the hook 26 has hooked onto the U-bolt, the elongated pole 16 is manually pulled and retracted back by the individual to release the magnet 10 from the winched hook 26. The crank from the trailer is then pulled back towards the trailer by the user and pulls the boat 30 onto the trailer 24. Thus, the boat 30 is cranked onto the trailer 24 without the individual having to enter the water.

In one embodiment, the pole is stored when not in use, onto the trailer side using straps 22. The pole 16 is retracted into its shortest position and the straps 22 close around the pole to hold it in position.

It should be understood, of course, that the foregoing relates to exemplary embodiments of the invention and that modifications may be made without departing from the spirit and scope of the invention as set forth in the following claims.

What is claimed is:

1. A method of attaching a boat to a trailer comprising:
   providing a boat attachment device comprising;
      an elongated rigid pole, the pole being extendable and retractable and comprising a curved proximal end;
      a curved magnet attached to the curved proximal end of the elongated rigid pole, the curved magnet attracted to and contouring to a metal hook of a trailer and
      a first side grip and a second side grip extending from opposing sides of the curved proximal end of the elongated rigid pole, wherein the curved magnet is disposed between the first and second side grips;
   winding a crank on the trailer to extend the metal hook attached to the curved magnet towards the boat, the metal hook attached to a proximal end of an extendable and retractable wire attached to the crank;
   maneuvering the metal hook to hook on a U-bolt on the boat;
   pulling on the elongated rigid pole to release the curved magnet from the metal hook; and
   winding the crank to retract the metal hook with the attached boat towards the trailer.

2. The method of claim 1, wherein the elongated rigid pole extends up to 12 feet.

3. The method of claim 1, wherein the curved magnet includes a rubber side grip on each side of the curved magnet.

4. The method of claim 1, wherein the metal hook and the curved magnet are substantially the same curved shape.

5. The method of claim 1, wherein the boat is retracted by an individual near the trailer, the individual not getting in the water to retract the boat towards the trailer.

6. The method of claim 1, wherein the elongated rigid pole includes straps to secure around the extended pole when retracted.

7. The method of claim 1, wherein the curved magnet is detached from the metal hook after the boat has been pulled onto the trailer.

8. The method of claim 1, wherein the metal hook is hooked onto the U-bolt of the boat by maneuvering the elongated rigid pole.

9. A boat attachment device comprising:
   an elongated rigid pole comprising a distal end and a proximal end;
   a curved magnet comprising a front surface, a rear surface opposite the front surface, a first side edge, a second side edge opposite the first side edge, a top end, and a bottom end opposite the top end, wherein the rear surface is coupled to the elongated rigid pole and the front surface comprises a bend less than 180 degrees and defining a concave shape curving from the top end to the bottom end, wherein the concave shape is facing away from the elongated pole; and
   a first side grip disposed along the first side edge and protruding away from the elongated pole and a second side grip disposed along the second side edge and protruding away from the elongated pole, wherein a channel is defined by the first side grip, the second side grip, and the front surface of the curved magnet, the channel is configured to receiver a hook therein.

* * * * *